Jan. 30, 1945.  G. A. LYON  2,368,242
WHEEL CONSTRUCTION
Filed April 23, 1943
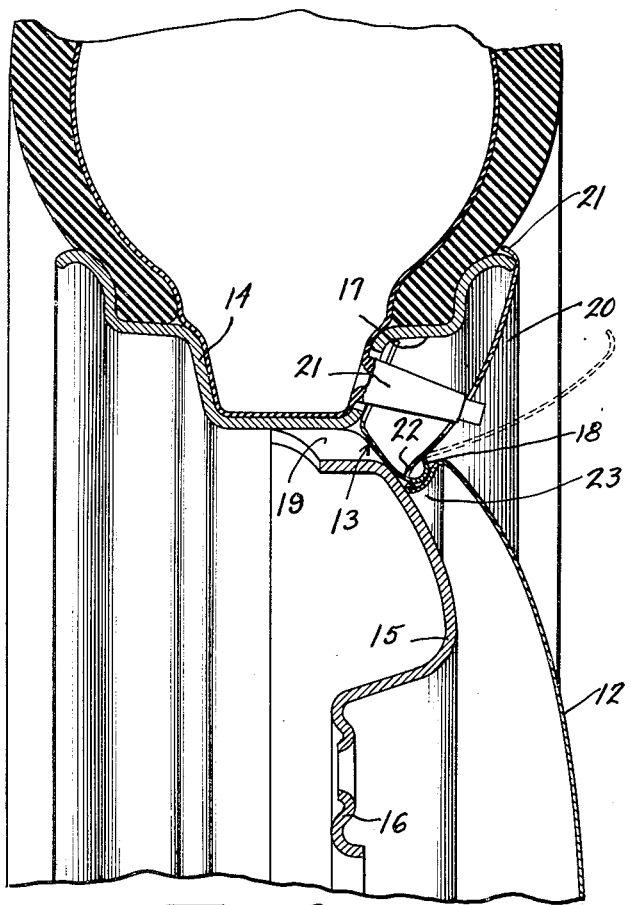
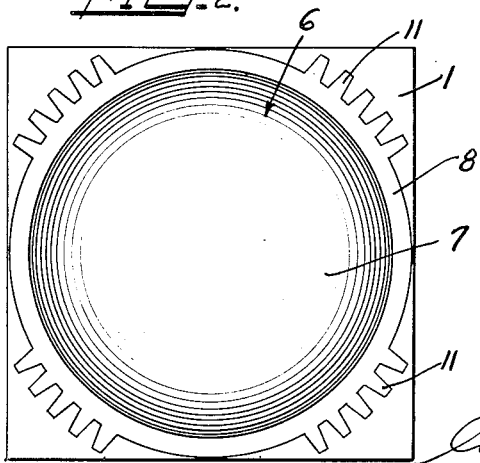
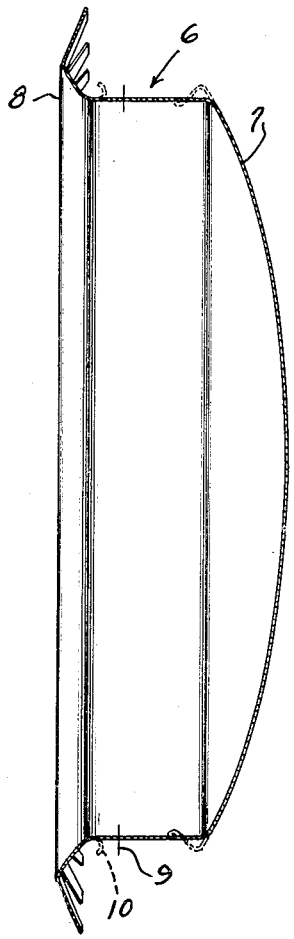
Inventor
GEORGE ALBERT LYON.
by Charles W Hills
Attys.

Patented Jan. 30, 1945

2,368,242

UNITED STATES PATENT OFFICE 2,368,242

WHEEL CONSTRUCTION

George Albert Lyon, Allenhurst, N. J.

Application April 23, 1943, Serial No. 484,134

3 Claims. (Cl. 301—37)

This invention relates to a wheel construction and more particularly to a novelly arranged retaining means for holding a trim ring on the flange rim of a wheel and which is also adapted to be used to retain a hub cap over the body of the wheel.

An object of this invention is to provide an improved and simplified wheel construction wherein a single retaining ring may be utilized for both the function of holding the trim ring or the flange rim of a wheel on the wheel, as well as for holding a hub cap over the body part of the wheel.

Another object of this invention is to provide a novel wheel cover or trim retaining means which is in the form of an annulus constructed and arranged to be self-retained on the flanges of a wheel rim, and adapted to be utilized to hold either a trim ring on the wheel or a hub cap, or both, as desired.

Another object of this invention is to provide in a wheel construction a novel and unique combination of a highly flexible plastic trim ring with comparatively rigid retaining means for holding the ring in place and which will permit of the ring being elastically retained on the holding means.

Still another object of this invention is to provide a novel cover retaining ring for a wheel which may be economically manufactured from the same sheet of material as the hub cap.

In accordance with the general features of this invention there is provided in a wheel structure including a multi-flanged tire rim and a body part, a wheel cover ring retained solely by itself on the flanged tire rim and having a free portion projecting laterally from the wheel body part and formed into a cover retaining shoulder, and a flexible cover ring for concealing the outer flange of the rim and having an inner margin elastically snapped over and into retained engagement with the shoulder.

Another feature of the invention relates to the formation of the shoulder on the cover retaining ring in such a manner that it may also be utilized to retain a hub cap on the wheel, the hub cap having a skirt pressed inside of the shoulder into retained detachable engagement therewith.

Another feature of the invention relates to the formation of the trim ring of a rubber like material such as a synthetic plastic, and it being of such a cross-sectional construction that it may be readily flexed in order to afford access to the valve stem therebehind, as well as to enable its application to and removal from the retaining ring on the wheel.

Other objects and features of this invention will more fully appear from the following detailed description taken in connection with the accompanying drawing, which illustrates a single embodiment thereof, and in which Figure 1 is a view showing how a dome shaped article may be pressed from the sheet to provide a hub cap and a trim ring retaining ring, such view comprising a cross-section through the dome shaped article pressed from the sheet;

Figure 2 is a plan view of the structure of Figure 2, and Figure 3 is an enlarged cross-sectional view through a circular wheel such as an automobile wheel showing applied thereto my novel trim ring, retaining ring and hub cap, and illustrating the manner in which they cooperate, the dotted line illustration showing the manner in which the trim ring may be flexed to afford access to the rear of the same.

In the drawing:

Figure 1 shows a stamping made from the sheet 5, this stamping being in the form of a hollow dome-shaped article designated generally by the reference character 6 comprising a dome portion 7 which is ultimately formed into the hub cap, and a ring portion 8 which is ultimately formed into the retaining ring. The two parts or portions 7 and 8 are severed from each other along the line of severance designated generally by the reference character 9. Prior or subsequent to this severing operation the hub cap or portion 7 may be subjected to an upsetting operation to provide the cap with the usual rearwardly inclined retaining skirt.

In addition, after the two portions, 7 and 8, are separated the inner edge of the ring 8 may be curled back upon itself as indicated by the dotted line at 10 so as to form a shoulder which is utilized in the retaining of the trim ring and hub cap parts on the wheel.

In Figure 2 I have illustrated a plan view of the shell shown in Figure 1, which view shows how the ring portion 8 is blanked from the square sheet 5 so as to utilize the four corners of the sheet to provide the ring with retaining fingers 11 at the four corners.

The final cross-sectional shapes of the retaining ring and the hub cap are shown in Figure 3, in which figure these parts are illustrated as applied to the wheel. In order to avoid confusion, I have applied different reference numerals to these two parts. I have designated the hub cap by the reference character 12 and have likewise designated the retaining ring by the reference character 13. These two parts are cooperable with each other on the usual automobile wheel which comprises a drop-center type of flanged tire rim 14, to which is attached at spaced intervals the usual wheel body or spider 15 having a central bolt-on flange 16.

In the application of the wheel trim or cover retaining ring 13 to the wheel, it is pressed axially into the inside of the flanged outer side of the tire rim until its fingers 17 at its four corners bite into one of the inclined flanges 17 of the rim 14. When in this position, the ring is firmly bottomed against the tire rim base and is held at its outer periphery by the biting engagement of the fingers. The ring also has a radially inwardly inclined portion terminating in the curled free edge or shoulder 18 which overlies the outer marginal portion of the wheel body or spider radially inwardly of the usual wheel openings 19 in the wheel spider. This curled shoulder faces substantially radially outwardly and is adapted to receive inside of the same the inner edge of a highly flexible wheel trim or cover ring 20 which is made of a rubber-like material such, for example, as synthetic plastic. This ring 20 has a curled outer edge 21 adapted to snap over the outermost edge of the side flange of the rim and has a slightly turned inner edge 21 adapted to seat inside of the curled shoulder 18 on the retaining ring 13.

The plastic ring 20 may be, of course, ornamented in any suitable manner and is easily applied to the shoulder 18 by elastically stretching or snapping it over the extremity of the shoulder. When it is desired to have access to the usual valve stem 21, such access may be usually obtained by flexing the ring 20 outwardly to the dotted line position shown in Figure 4.

Now if it is so desired, the same curled shoulder 18 may be utilized to retain the hub cap 12 on the wheel, only in that case the hub cap is snapped inside of the curled shoulder instead of over its outer edge as in the case of the trim ring. The hub cap 12, of course, has the usual skirt 23 which is adapted to be resiliently snapped over the curled shoulder or extremity 18 of the retaining ring 13. Sufficient space is provided between the extremity of the hub cap and the outer face of the trim ring 20 to permit of a pry-off tool being inserted under the edge of the hub cap for the purpose of prying it free from the wheel.

If it is so desired, the trim ring 20 may be so fabricated as to have a white appearing outer surface. In that event, that surface, by reason of the juxtaposition of the edge 21 of the trim ring to the tire causes the tire rim to appear to be a white side wall portion of the tire. This arrangement is highly advantageous since the wheel is then visualized as one wherein the tire appears to extend clear down to the hub cap 12. This also gives the effect of the tire having a massive appearance with only a comparatively small hub cap at its center.

I claim as my invention:

1. In a wheel structure including a multi-flanged tire rim and a body part, a wheel cover ring including a cover retaining part and wheel engaging means, said ring being retained solely by its engagement with the flanged tire rim and said cover retaining part thereof having a free portion projecting laterally from the wheel body part and formed into a cover retaining shoulder, a flexible cover ring for concealing the outer flange of the rim and having an inner margin detachably snapped over and into retained engagement with said shoulder, and a hub cap having a skirt pressed inside of said shoulder into retained detachable engagement therewith.

2. In a wheel structure including a multi-flanged tire rim and a body part, a wheel cover ring including a cover retaining part and wheel engaging means, said ring being retained solely by its engagement with the flanged tire rim and said cover retaining part thereof having a free portion projecting internally from the wheel body part and formed into a cover retaining shoulder, and a flexible cover ring for concealing the outer flange of the rim and having an inner margin detachably snapped over and into retained engagement with said shoulder, said flexible cover ring being made of a highly flexible rubber like material such as a synthetic plastic and being of such a width as to conceal the outer surfaces of the flanges of the tire rim with its outer edge overhanging the outer edge of the outermost flange of the tire rim.

3. In a wheel structure including a multi-flanged tire rim and a body part, a wheel cover ring including a cover retaining part and wheel engaging means, said ring being retained solely by its engagement with the flanged tire rim and said cover retaining part thereof having a free portion projecting laterally from the wheel body part and formed into a cover retaining shoulder, a flexible trim ring for concealing the outer flange of the rim and having an inner margin detachably snapped over and into retained engagement with said shoulder, and a hub cap having a skirt pressed inside of said shoulder into retained detachable engagement therewith, said trim ring being snapped over the shoulder in such a way as to be flexible to afford access to a valve stem or the like to the rear of the ring, and said hub cap being detachably engaged with the inner surface of said shoulder so as to be removable without interfering with the retention of the cover ring on the wheel.

GEORGE ALBERT LYON.